United States Patent [19]
Graf

[11] Patent Number: 5,979,641
[45] Date of Patent: Nov. 9, 1999

[54] PAPER ROLL GUIDE

[75] Inventor: Edwin X. Graf, Menasha, Wis.

[73] Assignee: Voith Sulzer Paper Technology North America, Inc., Appleton, Wis.

[21] Appl. No.: 09/044,626

[22] Filed: Mar. 19, 1998

[51] Int. Cl.[6] .................................................. B65G 39/16
[52] U.S. Cl. ..................................... 198/807; 198/810.03
[58] Field of Search .................................. 198/806, 807, 198/810.03

[56] References Cited

U.S. PATENT DOCUMENTS

| | | | |
|---|---|---|---|
| 3,066,547 | 12/1962 | Evans et al. .............................. | 198/806 |
| 5,471,289 | 11/1995 | Satoh et al. .......................... | 198/806 X |
| 5,653,331 | 8/1997 | Graf ........................................ | 198/807 |
| 5,717,984 | 2/1998 | Wong .................................... | 198/806 X |

*Primary Examiner*—James R. Bidwell
*Attorney, Agent, or Firm*—Taylor & Associates, P.C.

[57] ABSTRACT

A paper machine includes a guide connected to a roll for moving an end of the roll in transverse directions to a longitudinal axis of the roll. The guide includes a support frame and a roll mounting frame pivotally connected to the support frame at a pivot axis. The roll mounting frame is connected to and rotatably carries the roll. Two positioning devices are respectively disposed between and engage each of the support frame and the roll mounting frame on opposite sides of the pivot axis. The two positioning devices pivot the roll mounting frame about the pivot axis and thereby move the roll in one of the transverse directions. The two positioning devices coact to maintain the roll mounting frame in one of a plurality of positions relative to the support frame.

14 Claims, 2 Drawing Sheets

PAPER ROLL GUIDE

BACKGROUND OF THE INVENTION

1. Field of the Invention

The present invention relates to paper machines, and, more particularly, to a guide for moving a paper roll in a paper machine and thereby steering a moving fiber web.

2. Description of the Related Art

Paper machines typically include a belt which is used to carry a fiber material disposed across the width thereof, such as a fiber web in the form of a paper web. The belt is carried by a plurality of rolls, and may be in the form of, e.g., a polyester forming fabric, felt, conveyor belt, or dryer fabric. A plurality of belts may be provided which successively carry the fiber web from one end of the paper machine to the other end. Such belts can generally be viewed as conveying, dewatering and drying belts.

To properly position the belt on the paper machine during operation, it is necessary that the belt be "steered" such that the belt moves a predetermined amount from side to side on the machine during operation. Typically, a mechanical paddle disposed on each side of the belt may be engaged by the belt upon occurrence of sideways movement of the belt past a predetermined threshold. Actuation of the paddle in turn causes a roll guide to move an end of a selected paper roll in a predetermined transverse direction relative to the longitudinal axis of the selected roll. Such transverse movement of the roll causes the belt to move back toward the opposite side of the machine, thus maintaining the belt in proper running alignment on the paper machine.

Conventional roll guides used for moving a roll in a transverse direction relative to the longitudinal axis of the roll typically include a roll mounting frame to which an end of the roll is connected. The roll mounting frame is connected to a further support frame using a pair of rigid arms which are pivotally attached at opposing ends thereof to the roll mounting frame and support frame using a reduced friction bearing assembly, such as a spherical roller bearing. The rigid arms oscillate over a very limited range of movement as the roll mounting frame is moved in the transverse direction by a positioning device, such as a hydraulic ram, screw or the like. In other words, the pair of rigid arms, roll mounting frame and further support frame essentially define a 4-bar linkage with the roll mounting frame and further support frame being disposed generally parallel to each other and the pair of rigid arms being disposed generally parallel to each other. Application of a transverse force by the hydraulic ram, screw, etc., moves the roll mounting frame from side to side, while still maintaining the roll mounting frame generally parallel to the further support frame.

A problem with conventional paper roll guides is that the anti-friction bearings at respective ends of the pair of rigid arms associated with each roll guide undergo only limited oscillatory movement. The anti-friction bearings include metallic bearing elements and such limited oscillatory movement does not allow proper elastro-hydrodynamic lubrication of the metallic bearing elements, such as by formation of an oil film between the inner and outer races, and allows metal to metal contact to occur in the bearing. When such metal to metal contact occurs, "brinelling" results. Brinelling and subsequent spalling result in permanent deformation of the bearing and shortened life of the paper roll guide.

What is needed in the art is a paper roll guide which is simpler and less expensive than conventional paper roll guides, and which avoids the problem of proper lubrication of bearings present in conventional paper roll guides.

SUMMARY OF THE INVENTION

The present invention provides a guide for moving an end of the paper roll in a transverse direction to a longitudinal axis of the paper roll, including a roll mounting frame which is pivotally mounted to a support frame and caused to pivot about a pivot axis by a pair of air bags which are respectively positioned between the support frame and one of a pair of lever arms formed by the roll mounting frame on opposite sides of the pivot axis.

The invention comprises, in one form thereof, a paper machine including a guide connected to a roll for moving an end of the roll in transverse directions to a longitudinal axis of the roll. The guide includes a support frame and a roll mounting frame pivotally connected to the support frame at a pivot axis. The roll mounting frame is connected to and rotatably carries the roll. Two positioning devices are respectively disposed between and engage each of the support frame and the roll mounting frame on opposite sides of the pivot axis. The two positioning devices pivot the roll mounting frame about the pivot axis and thereby move the roll in one of the transverse directions. The two positioning devices coact to maintain the roll mounting frame in one of a plurality of positions relative to the support frame.

An advantage of the present invention is that a reliable, yet relatively inexpensive paper roll guide is provided.

Yet another advantage is that the paper roll guide of the present invention has a simplified structure as compared to conventional roll guides.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
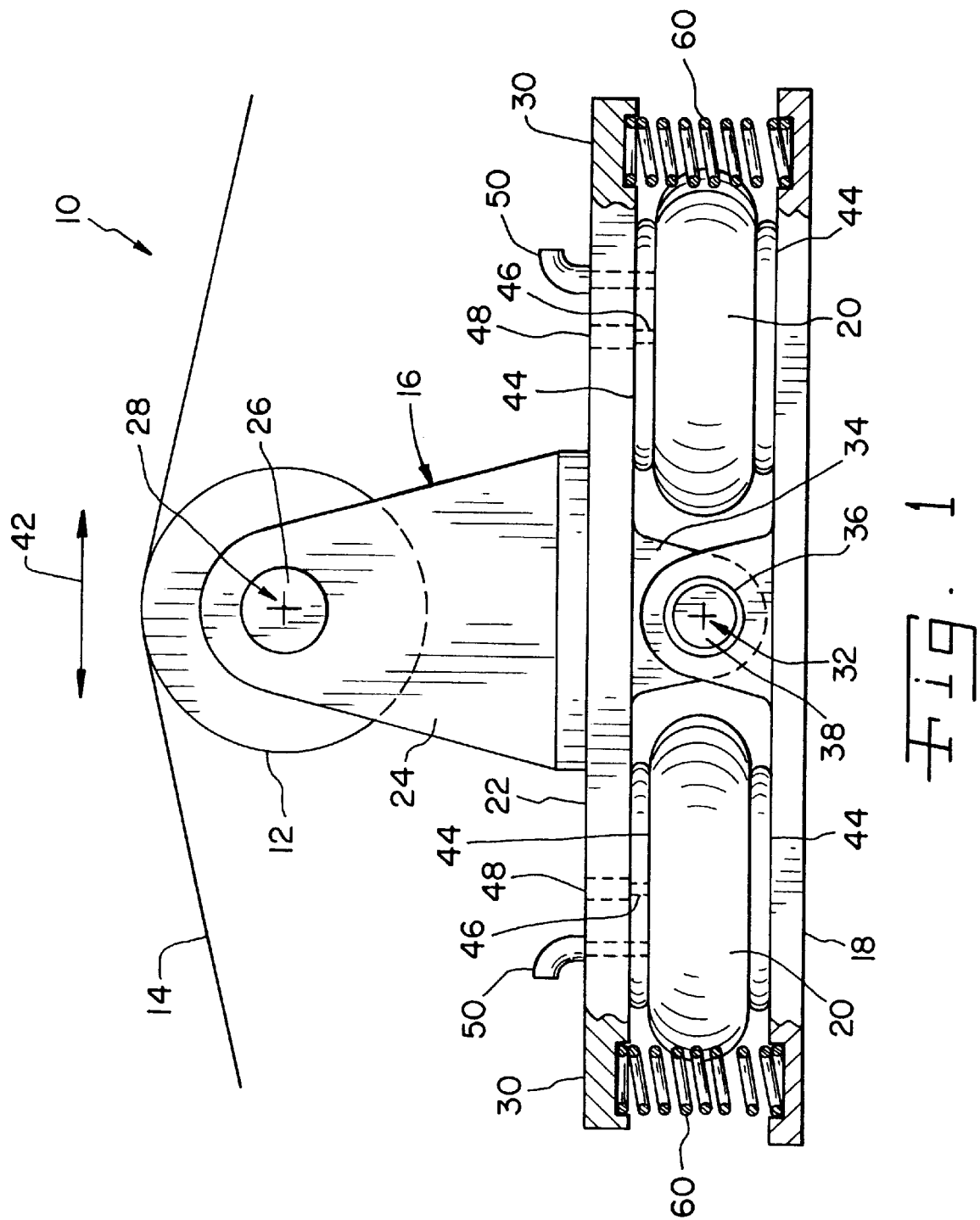
FIG. 1 is a plan view of an embodiment of a paper roll guide of the present invention.
Figure 2:
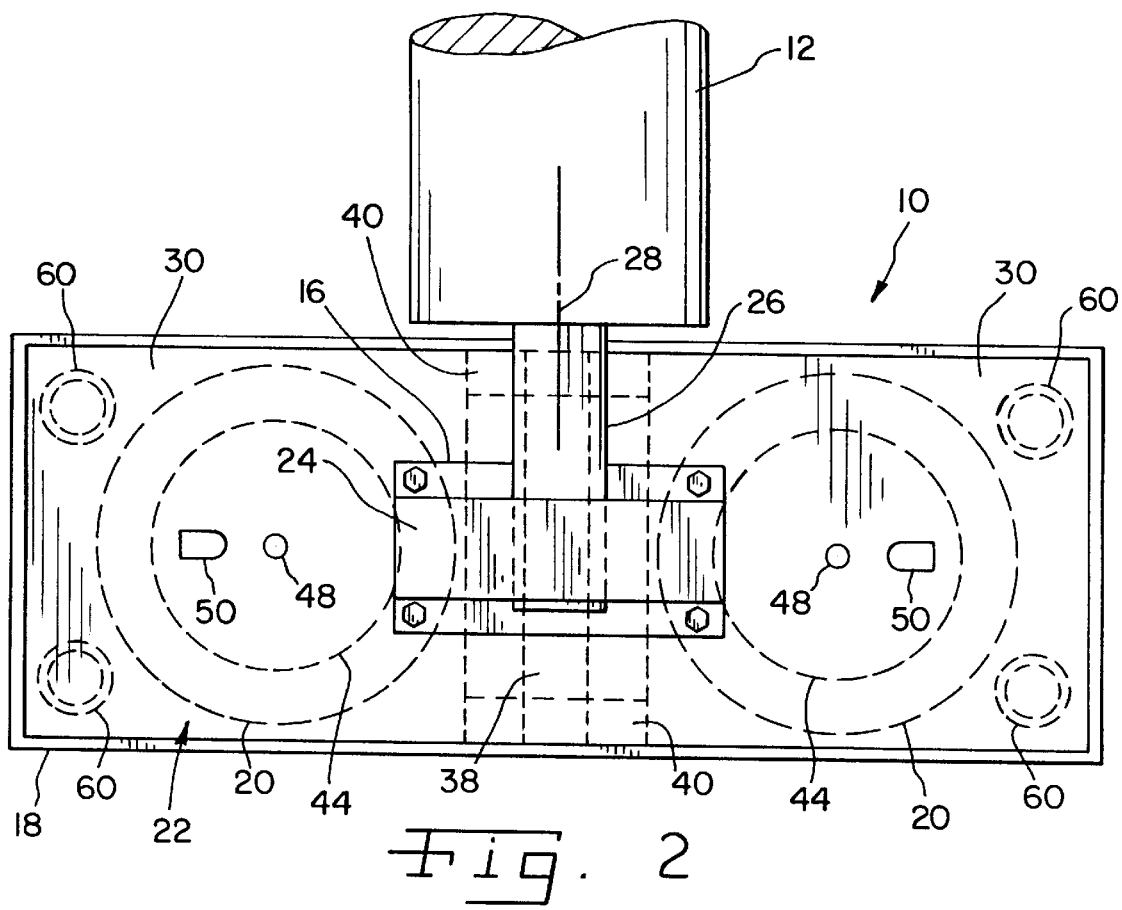
FIG. 2 is a fragmentary, top view of the paper roll guide shown in FIG. 1.

Referring now to the drawings, and more particularly to FIGS. 1 and 2, there is shown an embodiment of a paper roll guide 10 of the present invention. Paper roll guide 10 is part of a paper machine, such as a paper-making machine, which includes a roll 12 for carrying a belt 14. Belt 14 is intended to be defined broadly herein, and may be e.g., an endless belt for conveying, dewatering and/or drying a fiber web such as a paper web carried thereby.

Paper roll guide 10 generally includes a roll mounting frame 16, a support frame 18 and two positioning devices 20. Roll mounting frame 16 includes a plate 22 and an arm 24. Arm 24 includes a suitable bearing assembly for rotatably carrying and supporting roll 12. In particular, a shaft 26 attached to an end of roll 12 is rotatably carried by a bearing assembly of arm 24. A longitudinal axis 28 of roll 12 is substantially co-axial with shaft 26.

Plate 22 of roll mounting frame 16 is pivotally connected to support frame 18 at a pivot axis 32. More particularly, an ear 34 extends from a side of plate 22 which is opposite from arm 24, and includes an opening for receiving a bearing assembly 36, to be described in more detail hereinafter. In the embodiment shown, ear 34 has a width of approximately 5 inches (in a direction perpendicular to the drawing plane of FIG. 1). Bearing assembly 36 is disposed between an inside diameter of the opening formed in ear 34 and the outside diameter of a shaft 38, and allows relative pivotal movement therebetween.

Support frame 18 is mounted to or forms part of any suitable and convenient structure for supporting paper roll guide 10 and roll 12. For example, support frame 18 may be attached to a beam frame work surrounding at least a portion of the paper machine. Support frame 18 includes two ears 40 which are disposed on either end of ear 34 and connected with either end of shaft 38.

Positioning devices 20 are respectively disposed between and engage each of support frame 18 and roll mounting frame 16 on opposite sides of pivot axis 32. Positioning devices 20 pivot roll mounting frame 16 about pivot axis 32 and thereby move roll 12 in a selected one of two transverse directions 42.

Positioning devices 20, in the embodiment shown, are in the form of two inflatable elastic members disposed between roll mounting frame 16 and support frame 18. Inflatable elastic members 20 may be formed from a suitable elastic material, such as natural rubber, epichlorohydrin, neoprene or silicone rubber, and may be fiber reinforced. Inflatable elastic members 20 are engaged with roll mounting frame 16 for moving roll mounting frame 16 in the transverse direction 42 and maintaining roll mounting frame 16 in one of a plurality of positions relative to support frame 18. More particularly, inflatable elastic members 20 include metal plates 44 which are mounted thereto, such as rolling the metal up and over the bead of the inflatable elastic member, by vulcanizing, or epoxying. The plate 44 of each inflatable elastic member 20 which is disposed against roll mounting frame 16 includes at least one threaded opening 46 for receiving a bolt 48 therein. Each inflatable elastic member 20 is thus attached to roll mounting frame 16 using a bolt 48. On the other hand, each inflatable elastic member 20 is operated so as to always be in contact with support frame 18. Accordingly, it is not necessary for inflatable elastic members 20 to be attached to support frame 18 (although such attachment is optional).

Inflatable elastic members 20 are therefore only engaged with (and not directly attached to) support frame 18.

Inflatable elastic members 20 are connected to a source of air (not shown) which maintains a selected pressure within each inflatable elastic member 20. More particularly, a fluid fitting 50 extends through plate 22 and is attached to a plate 44 of each inflatable elastic member 20. Each fluid fitting 50 is disposed in fluid communication with an interior of a corresponding inflatable elastic member 20 to allow pressurized air to flow thereto and therefrom. The air pressure within each inflatable elastic member 20 is dependent upon a signal which is received from a mechanical paddle or the like indicating a position of the running belt on the roll, as described above. Typically, one inflatable elastic member 20 is inflated while the other inflatable elastic member 20 is deflated, thereby effecting movement of roll 12 in a desired transverse direction 42 relative to longitudinal axis 28.

Figure 3:
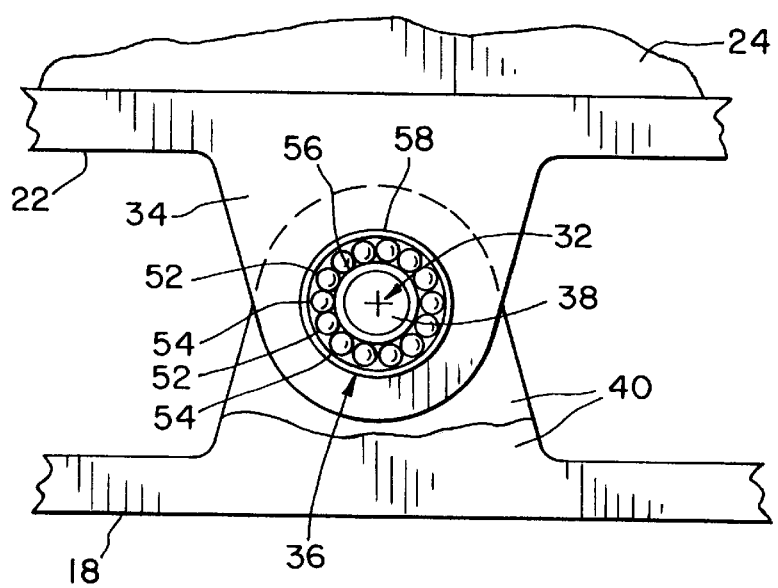
FIG. 3 is a fragmentary, enlarged view of an embodiment of the bearing assembly interconnecting the roll mounting frame with the support frame.

Referring now to FIG. 3, bearing assembly 36 which pivotally interconnects roll mounting frame 16 with support frame 18 will be described in more detail. As indicated above, a problem with conventional paper roll guides is that the four bars of the 4-bar linkage defined by a conventional guide pivotally move relative to each other with a relatively small pivotal movement. The resultant small amount of rotation of the metallic bearings within the bearing assembly does not allow proper lubrication of the bearing elements, and results in permanent damage to the bearing elements. In contrast, bearing assembly 36 in paper roll guide 10 includes a plurality of bearing elements 52 and 54 which are disposed between an inner race 56 and an outer race 58. Bearing elements 52 are formed from a metal, such as cold drawn stainless steel. In contrast, bearing elements 54 are formed from a non-metallic material having a coefficient of friction which is lower than the coefficient of friction of bearing elements 52. For example, non-metallic bearing elements 54 may be formed from a plastic such as Vespel DS-21™ (manufactured and sold by E. I. Dupont De Nemours). Such a plastic has the desirable characteristics of being tough, abrasion resistant and temperature resistant, as well as being self lubricating with a low coefficient of friction. By arranging metallic bearing elements 52 and non-metallic bearing elements 54 in an alternating manner between inner race 56 and outer race 58, metal to metal contact between adjacent bearing elements does not occur, thereby reducing friction between the sliding surfaces.

Also the longer axial length of the rolling elements inhibits spalling and brinelling. Large internal clearances (e.g., 0.005 to 0.010 inch) and rolling elements 52, 54 which are not exactly straight allow bearing assembly 36 to absorb shock and thereby further reduce the possibility of brinelling. Bearing assembly 36 thus is provided with a longer life with resultant decreased repair and down time costs. In the embodiment shown, each of metallic bearing elements 52 and non-metallic bearing elements 54 have a diameter of approximately 0.25 inch and a length of approximately 5 inches (corresponding to the width of ear 34)

Four energy counter balances 60 are disposed at respective corners of plate 22 and function to provide centering forces to return paper roll guide to an equilibrium position shown in FIG. 1. Two energy counter balances 60 are thus disposed on one side of pivot axis 32 between support frame 18 and a lever arm 30 while the other two energy counter balances are disposed on the opposite side of pivot axis between support frame 18 and the other lever arm 30. In the embodiment shown, energy counter balances 60 are in the form of compression springs which are substantially identical to each other. However, other types of energy counter balances may also be used.

In the embodiment shown, each positioning device 20 is in the form of an inflatable elastic member as described above. However, it will also be appreciated that other positioning devices may be used for moving roll mounting frame 16 in a selected transverse direction 42. For example, each positioning device 20 can be in the form of a hydraulic, pneumatic, mechanical, electrical and/or electro-mechanical device which effects movements of roll mounting frame 16 in a selected transverse direction 42.

Moreover, in the embodiment shown in the drawings, roll mounting frame 16 is positioned above support frame 18.

However, it is also to be understood that paper roll guide 10 may be positioned such that roll mounting frame 16 is oriented in any desired position relative to support frame 18, such as under or to the side of support frame 18.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a paper machine, a guide connected to a roll for moving an end of the roll in transverse directions to a longitudinal axis of the roll, said guide comprising:

a support frame;

a roll mounting frame pivotally connected to said support frame at a pivot axis, said roll mounting frame connected to and rotatably carrying the roll; and two positioning devices respectively disposed between and engaging each of said support frame and said roll mounting frame on opposite sides of said pivot axis, said two positioning devices pivoting said roll mounting frame about said pivot axis and thereby moving the roll in one of the transverse directions, said two positioning devices co-acting to maintain said roll mounting frame in one of a plurality of positions relative to said support frame.

2. The paper machine of claim 1, wherein said roll mounting frame includes two lever arms positioned on opposite sides of said pivot axis, each said positioning device being disposed between and engaging said support frame and a respective said lever arm on opposite sides of said pivot axis.

3. The paper machine of claim 2, wherein each said positioning device comprises an inflatable elastic member.

4. The paper machine of claim 3, wherein each said inflatable elastic member comprises a material selected from the group consisting essentially of neoprene and silicone rubber.

5. The paper machine of claim 2, further comprising at least two energy counterbalances, two of said energy counterbalances respectively positioned on opposite sides of said pivot axis between said support frame and a respective said lever arm.

6. The paper machine of claim 5, wherein each said energy counterbalance comprises a spring.

7. The paper machine of claim 6, wherein each said spring comprises a compression spring.

8. The paper machine of claim 6, wherein said at least two springs consists of four springs, two of said springs positioned on one side of said pivot axis between said support frame and a respective said lever arm, and an other two of said springs positioned on an opposite side of said pivot axis between said support frame and a respective said lever arm.

9. The paper machine of claim 1, further comprising a bearing assembly pivotally interconnecting said roll mounting frame with said support frame at said pivot axis, said bearing assembly comprising a plurality of bearing elements disposed between an inner race and an outer race, a portion of said bearing elements comprised of a metallic material and a remaining portion of said bearing elements comprised of a non-metallic material, said metallic bearing elements and said non-metallic bearing elements disposed in an alternating manner between said inner race and said outer race.

10. The paper machine of claim 9, wherein said non-metallic bearing elements have a coefficient of friction which is lower than said metallic bearing elements.

11. The paper machine of claim 10, wherein said non-metallic bearing elements are comprised of plastic.

12. In a paper machine, a guide connected to a roll for moving an end of the roll in transverse directions to a longitudinal axis of the roll, said guide comprising:

a support frame;

a roll mounting frame connected to and rotatably carrying the roll;

a bearing assembly defining a pivot axis and pivotally interconnecting said roll mounting frame with said support frame at said pivot axis, said bearing assembly comprising a plurality of bearing elements disposed between an inner race and an outer race, a portion of said bearing elements comprised of a metallic material and a remaining portion of said bearing elements comprised of a non-metallic material, said metallic bearing elements and said non-metallic bearing elements disposed in an alternating manner between said inner race and said outer race; and at least one positioning device respectively disposed between and engaging each of said support frame and said roll mounting frame, each said positioning device pivoting said roll mounting frame about said pivot axis and thereby moving the roll in one of the transverse directions, each said positioning device maintaining said roll mounting frame in one of a plurality of positions relative to said support frame.

13. The paper machine of claim 12, wherein said non-metallic bearing elements have a coefficient of friction which is lower than said metallic bearing elements.

14. The paper machine of claim 12, wherein said non-metallic bearing elements are comprised of plastic.

\* \* \* \* \*

UNITED STATES PATENT AND TRADEMARK OFFICE
CERTIFICATE OF CORRECTION

PATENT NO. : 5,979,641
DATED : November 9, 1999
INVENTOR(S) : Edwin X. Graf

It is certified that error appears in the above-identified patent and that said Letters Patent is hereby corrected as shown below:

COLUMN 3    On line 53, delete the space between

"is optional).", and    --Inflatable elastic members 20 are therefore only engaged with (and not directly attached to) support frame 18.--.

Signed and Sealed this

Thirtieth Day of January, 2001

Attest:

Attesting Officer

Q. TODD DICKINSON

Director of Patents and Trademarks